May 14, 1957 R. M. DWYER ET AL 2,792,042
MEAT GRINDERS
Filed Feb. 14, 1956 2 Sheets-Sheet 2
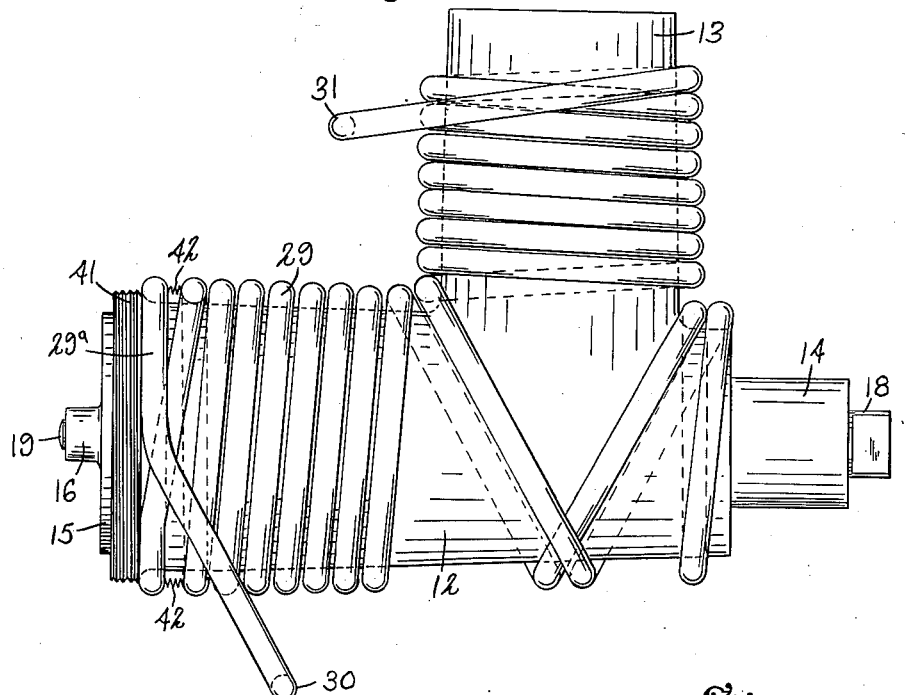
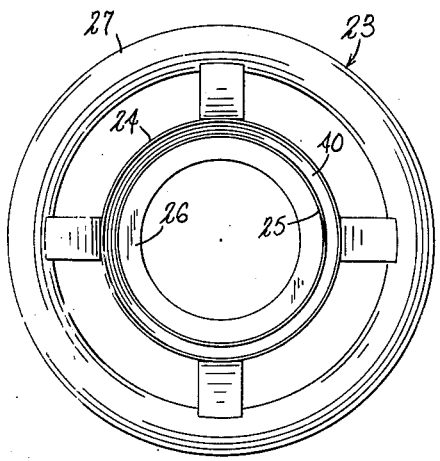
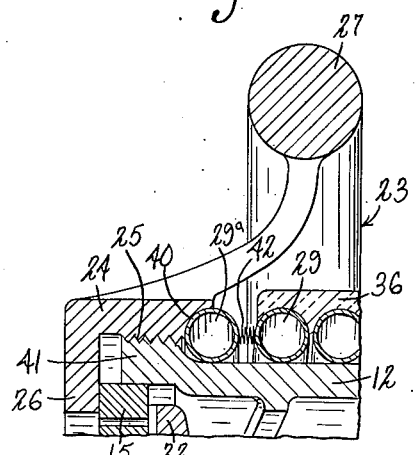
INVENTORS
Richard M. Dwyer
and William H. Pleiner
BY
Rockwell & Bartholow
ATTORNEYS

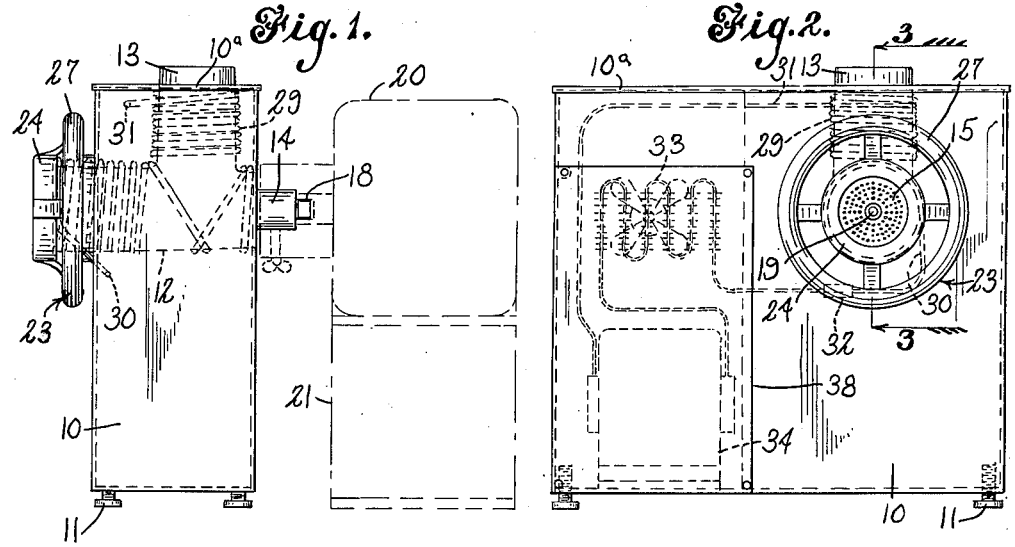
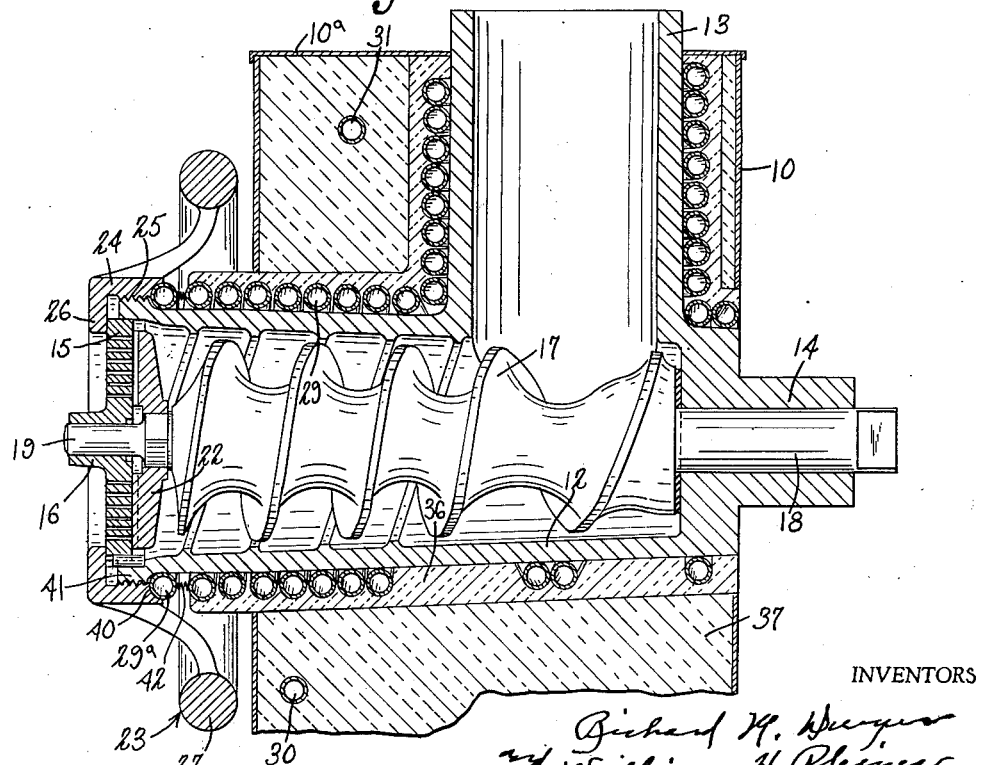

United States Patent Office 2,792,042
Patented May 14, 1957

2,792,042
MEAT GRINDERS

Richard M. Dwyer, Orange, and William H. Pleines, West Haven, Conn.

Application February 14, 1956, Serial No. 565,391

8 Claims. (Cl. 146—189)

This invention relates to meat grinders, and more particularly to a meat grinder provided with cooling means for the casing so that the latter will not be heated by the work performed and friction occurring during grinding of the meat and deleteriously affect the latter. While the invention is particularly concerned with the grinding of meat, it will, of course, be understood that it is applicable to other foods or materials as well.

In the grinding of meat and particularly where a considerable quantity is ground, the casing and working parts of the grinder will become heated due to friction developed in the operation of the machine. This will adversely affect the meat, particularly in that it will impart a white or gray color to the meat and, therefore, render it less pleasing in appearance than if it retained the bright reddish color desired.

Prior attempts have been made to solve this problem by cooling the grinder in various ways. In some instances meat market operators keep the grinding head or casing in the refrigerator when it is not in use so that it will be cold when used. However, it will soon become heated during the grinding operation so that this expedient is only partially successful. It has also been known to employ cooling coils about the casing of the grinder and to supply these coils with a cooling fluid so as to keep the temperature of the casing as low as possible. This will produce a desirable result but is still not completely successful in that the greatest friction in the machine is developed adjacent the outer or delivery end thereof where the ground products issue from the machine.

Grinders are usually provided with a perforated shear plate held in place in the outer or delivery end of the casing and a knife or cutter nonrotatably mounted on the rotor (which includes the screw feed) cooperates against the inner surface of this plate to cut the meat. A considerable amount of friction is, therefore, developed at the delivery end of the machine and particularly between the knife and shear plate, and the latter being separate from the casing becomes warm and the meat will issue from the device with a whitish or gray color notwithstanding the fact that the casing may be enclosed within cooling coils.

The shear plate referred to above is usually held in place by a ring nut threaded upon the exterior surface of the casing, and it has been found that if the casing of the grinder is embraced with cooling coils and these coils brought to the outer end of the casing to such a position that one thereof will not only engage the outer portion of the casing, but also the ring nut, so that it will draw the heat from the ring nut and, therefore, from the shear plate so that the shear plate and knife will be kept cool and the meat will be delivered from the machine with its natural red color.

One object of the present invention is to provide a meat grinder or chopper having improved means for cooling the parts of the same in order that the material ground will not be adversely affected by the heat developed by the machine.

A further object of the invention is to provide a meat grinder, the casing of which is embraced by continuous coils adapted to carry a cooling fluid, one of the coils being disposed adjacent the outer or delivery end of the casing so as to abut a portion of a ring nut used to hold the usual shear plate in place at the delivery end of the casing in order to cool the shear plate and adjacent portions of the casing.

A still further object of the invention is to provide a meat grinder or chopper of the character described above wherein the outer coil which engages the ring nut is urged against the latter by spring means so as to be maintained in contact therewith and efficiently cool the ring nut, the outer end of the casing and the associated parts.

To these and other ends the invention consists in the novel features and combinations of parts to be hereinafter described and claimed.

In the accompanying drawings:

Fig. 1 is a side elevational view of a meat grinder embodying our invention;

Fig. 2 is a front elevational view thereof;

Fig. 3 is an enlarged sectional view on line 3—3 of Fig. 2;

Fig. 4 is an enlarged elevational view of the casing of the meat grinder, showing the arrangement of the cooling coils thereon;

Fig. 5 is an enlarged sectional view of the outer or delivery end of the casing showing the arrangement of the coils at this point; and Fig. 6 is an enlarged inside view of the ring nut.

To illustrate a preferred embodiment of the invention the drawing discloses a meat grinder comprising an outer housing 10 serving as a support for the mechanism, this housing being provided with adjustable feet or other supporting members 11 so that it may be set at the proper level upon a table, counter or other supporting surface.

As shown more especially in the sectional view of Fig. 3, the grinder head is supported within the housing 10, this grinder comprising a substantially cylindrical casing portion 12 and a hopper portion 13, the latter communicating with the interior of the casing so that material may be fed through the hopper to be ground. The casing is provided at one end with a bearing 14 and at the other end with a perforated shear plate 15, this plate being partly received within the delivery end of the casing and having a bearing portion 16.

A rotor or screw-feeding member 17 is rotatably mounted within the casing, this member having a shaft 18 at one end rotatably mounted in the bearing 14 and a trunnion 19 at the other end rotatable in the bearing 16.

As shown in Figs. 1 and 3, the shaft 18 is adapted to project from the bearing 14 so as to be engaged by the shaft of a motor shown diagrammatically at 20, resting upon a support 21 so that the rotor may be driven by the motor.

Nonrotatably mounted on the screw-feeding member 17 is a cutter or knife 22 which will be rotated with the screw-feeding member or rotor and which cooperates with the perforated shear plate 15 to cut the meat urged outwardly by the rotor 17. It will be understood that the shear plate is fixed against rotation with respect to the casing as is usual and is held in place by a ring nut designated generally by the numeral 23 (see Fig. 6).

This ring nut is provided with an annular flange portion 24 having internal screw threads 25 adapted to engage cooperating threads upon the exterior surface of the delivery end of the casing portion 12 so that it may be adjustably secured in place. It is also provided with an inwardly projecting ring-like flange 26 adapted to extend over the outer periphery of the shear plate to hold the latter in place and adjust its position relatively to the knife 22. It is also provided with an operating ring 27 by which it may be manipulated so that it can be unscrewed and the parts removed for cleaning.

As shown more especially in Figs. 3 and 4, a cooling tube 29 is coiled about the casing of the chopper, there being fairly closely wound coils about the casing portion 12 and also about the hopper portion 13. These coils consist, as shown, of a continuous tube having an inlet end 30 and an outlet end 31. The inlet end of the tube leads to the usual expansion valve 32, thence to a condenser 33, and from the condenser to the outlet end of the compressor 34. The outlet end 31 of the tube is connected to the inlet end of the compressor 34.

The coils of the tube 19 upon the casing may be set in insulation such as asbestos cement 36. As shown particularly in Fig. 3, this insulation does not extend to the outer coil 29ª at the delivery end of the casing so that, while the remaining coils are rigidly secured to the casing by this insulation, the coil 29ª is free for limited movement thereon.

As also shown in Fig. 3, the head or casing of the grinder consisting of the parts 12 and 13 is placed in and supported by the housing 10, the top 10ª of which may be made removable for this purpose. The space in the housing or more accurately the space in the right-hand portion of the housing, as shown in Fig. 2, may also be filled with insulation 37. In the left-hand side of the housing 10 is mounted the refrigerating mechanism consisting of the compressor and the condenser, and this section of the housing may be partitioned from that part within which the head of the grinder is located. The left-hand portion of the housing may be provided with an opening covered by a removable plate 38 so that the refrigerating apparatus can be placed therein and serviced when necessary.

As previously stated, it is highly desirable to cool the shear plate 15 and the knife 22 adjacent thereto as considerable heat is developed by the friction between these elements. For this purpose the inner edge of the flange 24 is provided with an annular groove or recess 40 (Figs. 5 and 6), and it will be noted from Fig. 5 that the outer threaded portion of the casing 12 is slightly enlarged as shown at 41 so as to provide a seat for the outer coil 29ª. A spring or springs 42 positioned between the coil 29ª and the next adjacent of the coils 29 urge the former into this seat so as to maintain this first coil in close contact with the flange 24 of the ring nut and with the outer portion 41 of the casing. This serves to effectually cool the ring nut and the outer portion of the casing, which elements are in contact with the shear plate 15 and, therefore, cool the latter and the knife adjacent the shear plate. It may also be noted that the coil 29ª is the first coil to receive the coolant fluid from the refrigerating apparatus so that this portion of the casing receives the full effect of the cooling fluid.

It will be apparent that the ring nut may be tightened or loosened to some extent on the casing by means of its threaded connection therewith so as to adjust the position of the shear plate, and the coil 12 will always be urged into the groove 40 by the springs 42. The ring nut, as shown in Fig. 3, is positioned without the housing 10 so that it may be readily removed to remove the knife and rotor for cleaning when desired.

While we have shown and described one embodiment of our invention, it will be understood that it is not to be limited to all of the details shown, but is capable of modification and variation within the spirit of the invention and within the scope of the claims.

What we claim is:

1. A meat chopper comprsing a substantially cylindrical casing, a rotor mounted therein, a perforated shear plate disposed at the delivery end of the casing and a cutting member on the rotor cooperating with said shear plate, a ring nut having a flange fitting over and threadedly mounted on said end of the casing, said ring nut bearing against the shear plate to hold the latter in place, a cooling tube coiled about the casing and extending to the delivery end thereof, said ring nut flange having a recess in its inner edge and the outer coil of said tube being disposed in said recess to make contact with said ring nut over a large area to cool the same and thereby cool the plate, and means to supply a cooling fluid to the tube.

2. A meat chopper comprising a substantially cylindrical casing, a rotor mounted therein, a perforated shear plate disposed at the delivery end of the casing and a cutting member on the rotor cooperating with said shear plate, a ring nut having a flange fitting over and threadedly mounted on said end of the casing, said ring nut bearing against the shear plate to hold the latter in place, a cooling tube coiled about the casing and extending to the delivery end thereof, said ring nut flange having a recess in its inner edge and the outer coil of said tube being disposed in said recess to make contact with said ring nut over a large area to cool the same and thereby cool the plate, means to supply a cooling fluid to the tube, and said outer coil being free for movement axially of the casing, and the adjoining coils being fixed on the casing.

3. A meat chopper comprising a substantially cylindrical casing, a rotor mounted therein, a perforated shear plate disposed at the delivery end of the casing and a cutting member on the rotor cooperating with said shear plate, a ring nut having a flange fitting over and threadedly mounted on said end of the casing, said ring nut bearing against the shear plate to hold the latter in place, a cooling tube coiled about the casing and extending to the delivery end thereof, said ring nut flange having a recess in its inner edge and the outer coil of said tube being disposed in said recess to make contact with said ring nut over a large area to cool the same and thereby cool the plate, means to supply a cooling fluid to the tube, said outer coil being free for movement axially of the casing, the adjoining coils being fixed on the casing, and resilient means urging said outer coil toward said ring nut.

4. A meat chopper comprising a substantially cylindrical casing, a rotor mounted therein, a perforated shear plate disposed at the delivery end of the casing and a cutting member on the rotor cooperating with said shear plate, a ring nut having a flange fitting over and threadedly mounted on said end of the casing, said ring nut bearing against the shear plate to hold the latter in place, a cooling tube coiled about the casing and extending to the delivery end thereof, said ring nut flange having a recess in its inner edge and the outer coil of said tube being disposed in said recess to make direct contact with said ring nut to cool the same and thereby cool said plate, means to supply a cooling fluid to said tube, a hopper portion on the casing communicating with the interior thereof, and the coils of said tube being continued around said hopper portion to cool the latter.

5. A meat chopper comprising a substantially cylindrical casing, a rotor mounted therein, a perforated shear plate disposed at the delivery end of the casing and a cutting member on the rotor cooperating with said shear plate, a ring nut having a flange fitting over and threadedly mounted on said end of the casing, said ring nut bearing against the shear plate to hold the latter in place, a cooling tube coiled about the casing and extending to the delivery end thereof, the inner edge of said flange beyond the threads thereon being spaced from the casing to provide a recess between such edge and the casing, and the outer coil of said tube being disposed in said recess and in contact with the casing and with the flange, and means to supply a cooling fluid to said tube.

6. A meat chopper comprising a grinder head having a substantially cylindrical casing, a rotor rotatably mounted therein, a cutter carried by the rotor, a perforated shear plate mounted in the outer end of the casing in opposed relation to the cutter, a ring nut having a flange bearing against said plate to hold it in place, and a second flange embracing the outer end of the casing, the casing being enlarged exteriorly adjacent its outer end and having external screw threads on said enlarged portion, said last-named flange having internal threads engaging the threads on the casing and having a portion extending beyond said threads, said portion having an internal recess at its inner edge facing the casing, a tubular element coiled around said casing having its outer coil lodged in said recess between the flange and the casing, insulating material covering the remaining coils and securing them in place on the casing, and means to supply a cooling fluid to said tubular element.

7. A meat chopper comprising a grinder head having a substantially cylindrical casing, a rotor rotatably mounted therein, a cutter carried by the rotor, a perforated shear plate mounted in the outer end of the casing in opposed relation to the cutter, a ring nut having a flange bearing against said plate to hold it in place, and a second flange embracing the outer end of the casing, the casing being enlarged exteriorly adjacent its outer end and having external screw threads on said enlarged portion, said last-named flange having internal threads engaging the threads on the casing and having a portion extending beyond said threads, said portion having an internal recess at its inner edge facing the casing, a tubular element coiled around said casing having its outer coil lodged in said recess between the flange and the casing, insulating material covering the remaining coils and securing them in place on the casing, means to supply a cooling fluid to said tubular element, said outer coil being free for limited movement on the casing, and spring means urging said coil into said recess.

8. A meat chopper comprising a grinder head having a substantially cylindrical casing, a rotor rotatably mounted therein, a cutter carried by the rotor, a perforated shear plate mounted in the outer end of the casing in opposed relation to the cutter, a ring nut having a flange bearing against said plate to hold it in place, and a second flange embracing the outer end of the casing, the casing being enlarged exteriorly adjacent its outer end and having external screw threads on said enlarged portion, said last-named flange having internal threads engaging the threads on the casing and having a portion extending beyond said threads, said portion having an internal recess at its inner edge facing the casing, a tubular element coiled around said casing having its outer coil lodged in said recess between the flange and the casing, insulating material covering the remaining coils and securing them in place on the casing, means to supply a cooling fluid to said tubular element, said outer coil being free for limited movement on the casing, and spring means acting between said outer coil and the next adjacent coil of said tubular element to urge the former toward said recess.

References Cited in the file of this patent

UNITED STATES PATENTS

| | | |
|---|---|---|
| 1,798,725 | Christensen et al. | Mar. 31, 1931 |
| 2,060,605 | Biancalana | Nov. 10, 1936 |
| 2,526,498 | Pacciano | Oct. 17, 1950 |
| 2,693,835 | Lundell | Nov. 9, 1954 |